US010233099B2

(12) United States Patent
Namiki et al.

(10) Patent No.: US 10,233,099 B2
(45) Date of Patent: Mar. 19, 2019

(54) RADIOACTIVE CESIUM DECONTAMINATOR AND METHOD OF PRODUCING THE SAME, AND METHOD OF REMOVING THE RADIOACTIVE CESIUM

(71) Applicants: THE JIKEI UNIVERSITY, Tokyo (JP); DOWA HOLDINGS CO., LTD., Tokyo (JP)

(72) Inventors: Yoshihisa Namiki, Tokyo (JP); Toshihiko Ueyama, Tokyo (JP); Takayuki Yoshida, Tokyo (JP); Ryoei Watanabe, Tokyo (JP)

(73) Assignees: THE JIKEI UNIVERSITY, Tokyo (JP); DOWA HOLDINGS CO., LTD., Tokyo (JP)

( * ) Notice: Subject to any disclaimer, the term of this patent is extended or adjusted under 35 U.S.C. 154(b) by 587 days.

(21) Appl. No.: 14/427,111

(22) PCT Filed: Sep. 10, 2013

(86) PCT No.: PCT/JP2013/074408
§ 371 (c)(1),
(2) Date: Mar. 10, 2015

(87) PCT Pub. No.: WO2014/038713
PCT Pub. Date: Mar. 13, 2014

(65) Prior Publication Data
US 2015/0239758 A1     Aug. 27, 2015

(30) Foreign Application Priority Data

Sep. 10, 2012  (JP) .................................. 2012-199000
Aug. 27, 2013  (JP) .................................. 2013-176096

(51) Int. Cl.
*B03C 1/01*        (2006.01)
*C02F 1/00*        (2006.01)
(Continued)

(52) U.S. Cl.
CPC ........... *C02F 1/488* (2013.01); *B01J 20/0225* (2013.01); *B01J 20/0229* (2013.01);
(Continued)

(58) Field of Classification Search
CPC ....... C02F 1/488; C02F 1/48; B01J 20/28057; B01J 20/28009; B01J 20/28004;
(Continued)

(56) References Cited

U.S. PATENT DOCUMENTS 5,397,476 A * 3/1995 Bradbury ................. B01J 47/06
                                                        210/675
5,855,790 A * 1/1999 Bradbury ........... B01J 20/28009
                                                        210/222

(Continued)

FOREIGN PATENT DOCUMENTS

JP          4932054 B1      5/2012

OTHER PUBLICATIONS

Ito et al., 1st environmental radioactivity decontamination, Research Workshop Abstracts, 2012, pp. 51.
(Continued)

*Primary Examiner* — David C Mellon
(74) *Attorney, Agent, or Firm* — Oliff PLC (57) ABSTRACT

Disclosed herein is a radioactive cesium decontaminator, a method of producing a radioactive cesium decontaminator, and a method of removing radioactive cesium using the decontaminator. The radioactive cesium decontaminator is formed by agglomeration of primary particles. The primary particles have a magnetic particle as a core portion, a coating layer made of an organic material coating the magnetic particle, and a capturing compound made of ferrocyanide material formed on the coating layer. A cumulative diameter $D_{50}$ of the decontaminator is in a range of from 2.0 μm to 50 μm, and a value of a cumulative diameter distribution
(Continued)

$(D_{90}-D_{10})/D_{50}$ is less than 6. The decontaminator is made by adding a ferrocyanide aqueous solution and an aqueous solution containing at least one transition metal into a suspension liquid containing a precursor formed by magnetic particles coated with organic monomer or polymer while applying a strong shear force.

11 Claims, 3 Drawing Sheets

(51) Int. Cl.
| | |
|---|---|
| *C02F 1/48* | (2006.01) |
| *G21F 9/12* | (2006.01) |
| *G21F 9/28* | (2006.01) |
| *B01J 20/02* | (2006.01) |
| *B01J 20/26* | (2006.01) |
| *B01J 20/28* | (2006.01) |
| *B01J 20/32* | (2006.01) |
| *C02F 101/00* | (2006.01) |

(52) U.S. Cl.
CPC ....... *B01J 20/262* (2013.01); *B01J 20/28004* (2013.01); *B01J 20/28009* (2013.01); *B01J 20/28057* (2013.01); *B01J 20/3204* (2013.01); *B01J 20/3212* (2013.01); *B01J 20/3236* (2013.01); *B01J 20/3272* (2013.01); *B01J 20/3293* (2013.01); *C02F 1/48* (2013.01); *G21F 9/12* (2013.01); *G21F 9/28* (2013.01); *B03C 1/01* (2013.01); *C02F 1/001* (2013.01); *C02F 2101/006* (2013.01)

(58) Field of Classification Search
CPC .. B01J 20/0229; B01J 20/0225; B01J 20/262; B01J 20/3293; B01J 20/3272; B01J 20/3236; B01J 20/3212; B01J 20/3204; B01J 20/2803; B01J 20/28059; B01J 20/28061; G21F 9/28
See application file for complete search history.

(56) References Cited

U.S. PATENT DOCUMENTS

| | | | | |
|---|---|---|---|---|
| 5,935,380 | A * | 8/1999 | White | B01J 20/04 159/48.1 |
| 5,989,434 | A * | 11/1999 | Lundquist | B01J 20/28004 210/679 |
| 2005/0106098 | A1* | 5/2005 | Tsang | A61K 51/1244 424/1.11 |
| 2011/0036777 | A1* | 2/2011 | Pacary | G21C 19/46 210/682 |
| 2014/0042068 | A1* | 2/2014 | Namiki | G21F 9/12 210/222 |

OTHER PUBLICATIONS

Nishizaki et al., 1st environmental radioactivity decontamination, Research Workshop Abstracts, 2012, pp. 50.
Oct. 9, 2013 Search Report issued in International Patent Application No. PCT/JP2013/074408.

* cited by examiner

RADIOACTIVE CESIUM DECONTAMINATOR AND METHOD OF PRODUCING THE SAME, AND METHOD OF REMOVING THE RADIOACTIVE CESIUM

TECHNICAL FIELD

The present invention relates to an aggregate of a decontaminator particles for removing radioactive substance, and a method of producing the same, and a decontamination method using the aggregate of the decontaminator particles for removing radioactive substance, which are used for the recovery of contaminants such as radioactive cesium, etc., from incineration fly ash generated during an incineration process of municipal wastes, etc.

DESCRIPTION OF RELATED ART

When the radioactive substance is contained as a contaminant in the incineration fly ash generated in a general waste incineration site, etc., such a radioactive substance is an environmental regulation substance, and the treatment to such a material is a problem.

$^{134}$Cs and $^{137}$Cs in the radioactive substances, and particularly $^{137}$Cs has a long half-life of 30.2 years, thus involving a problem that most of the radioactive substance remains even after 10 years of generation. Therefore, there is a concern that the contaminants may adversely affect an environmental ecosystem over a long term. Accordingly, rapid removal of the contaminants from the environment is desired.

However, the radioactive cesium is significantly accumulated on the fine incineration fly ash having a particle size of 20 to 30 μm which is generated in the general waste incineration site, etc., and such an accumulation of the radioactive cesium sometimes reaches several tens of thousands of Bq/kg, according to the published data.

Under such a circumstance, one of the inventors of the present invention discloses a decontaminator of the radioactive cesium in patent document 1. The decontaminator of patent document 1 is capable of efficiently removing the radioactive cesium from a liquid containing the radioactive substance. Patent document 1 also discloses a technique of separating and recovering the radioactive cesium without a need for direct contact with a radioactive cesium captured decontaminator.

In recent years, the decontaminator obtained by granulating a magnetic powder-carrying material into a zeolitic adsorbent and a ferrocyanide-type adsorbent. For example, there is proposed a method of a decontamination treatment by dividing the process into two stages of neutralizing a liquid containing the radioactive substance using the zeolite type decontaminator, and carrying out decontamination using the iron ferrocyanide (Prussian blue) (Non-patent document 1). There is also proposed a method of adding zeolite and the iron ferrocyanide respectively into the liquid containing the radioactive substance and making pH to slightly alkaline, and thereafter removing and recovering the zeolite and the iron ferrocyanide with radioactive cesium adsorbed thereon (non-patent document 2).

PRIOR ART DOCUMENT

Patent Document

Patent document 1: Japanese Patent No. 4932054

Non-Patent Document

Non-patent document 1: 1$^{st}$ environmental radioactivity decontamination *Research Workshop Abstracts* (2012) p. 51 by Ito, et. al.

Non-patent document 2: 1$^{st}$ environmental radioactivity decontamination *Research Workshop Abstracts* (2012) p. 50 by Nishizaki, et. al.

SUMMARY OF THE INVENTION

Problem to be Solved by the Invention

A producing method described in patent document 1 includes: forming iron ferrocyanide once by mixing ferrocyanide and iron compound, and thereafter coating the surface of a magnetic particle with the iron ferrocyanide by stirring. There is a case that when it is attempted to process a number of magnetic particles by the abovementioned producing method, the surface of the magnetic powder is coated with the iron ferrocyanide only by stirring. However, according to the study by the inventors of the present invention, in the case of a greater batch volume particularly during treatment (producing), there is a case that the surface of the magnetic power is hardly coated with the iron ferrocyanide. Then, in this case, when the surface of the magnetic powder is not coated with the iron ferrocyanide, the generated iron ferrocyanide remains in a reaction liquid. Therefore, it is found that a problem is generated such that the iron ferrocyanide is discharged in the environment.

Further, when performing a removal operation using the decontaminator to avoid the possibility of discharging the ferrocyanide into the environment by separating the magnetic powder after coating and the reaction liquid and recovering only the decontaminator which is the magnetic powder after coating, it is found that there is a case that an adsorption ability of cesium of the magnetic powder after coating is lower than an estimated value, due to the fact that the obtained decontaminator is not sufficiently coated with the ferrocyanide.

In order to complement the reduction of the adsorption ability of the cesium of the magnetic powder after coating, it can be considered that treatment is applied to a suspension liquid of a material to be treated in a state that the radioactive cesium is dissolved in a slurry state, without separating the powder of the magnetic powder after coating and the reaction liquid from each other.

In this case, the iron ferrocyanide not adhered to the magnetic powder is also in a remained state. Therefore the cesium adsorption ability of the iron ferrocyanide is maintained, and it can be considered that high decontamination ability can be exhibited.

However, in this case, both of the decontaminated incineration fly ash and decontamination component in which the radioactive cesium is concentrated, are separated from the decontaminator. As a result, a decontamination result in total is deteriorated, and an amount of the discharged incineration fly ash is increased.

The inventors of the present invention further study on the separated ash in the treatment method described in patent document 1. Then, it is found that if an operation for removing such a radioactive cesium is performed in a state that especially fine particles such as incineration fly ash are suspended in a treatment liquid in which the radioactive cesium is dissolved, the fine particles are partially entangled with the decontaminator itself. In this case, the incineration fly ash which is supposed to be separated originally is also recovered together with the separated and recovered decontaminator. Therefore, it is found that the volume of the separated and recovered decontaminator is expanded, and it is difficult to achieve a goal of reducing the volume of a material containing the radioactive cesium of the amount exceeding 100000Bq/kg.

Further, according to a recent published technique as described in non-patent documents 1 and 2, the technique of using Prussian blue and zeolite in combination has been generally spread. However, from a viewpoint of storing the material having a high concentration of radioactivity, it is preferable to avoid a combination of Prussian blue and zeolite as much as possible, so that the volume of the decontaminator which needs to be stored is not allowed to be large. Namely, it is important to provide the decontaminator capable of reducing the volume of the decontaminator after treatment to be small as much as possible without involving a suspended material and without reducing the decontamination ability.

An object of the present invention is to provide a method of producing a radioactive cesium decontaminator (abbreviated as "decontaminator" in the present invention) having excellent cesium recovery power for the cesium in a liquid while maintaining a mass production, a radioactive cesium decontaminator suitable for rapidly separating and recovering the radioactive cesium from a suspension liquid of the material contaminated with radioactive cesium, and a method of removing the radioactive cesium from the material contaminated with the radioactive substance which is performed using the decontaminator.

Means for Solving the Problem

In order to solve the above-described problem, further strenuous efforts are made by the inventors of the present invention, and the following knowledge is obtained.

1. When producing a decontaminator particle, having a magnetic particle in a core portion; a coating layer for directly coating the magnetic particle and substantially formed between the magnetic particle and a capturing compound; and ferrocyanide on a surface layer as the capturing compound for capturing the radioactive substances, cesium adsorption amount of the decontaminator is not deteriorated even in the case of a mass production of the decontaminator particles, by an operation of adding strong shear force to slurry in the step of forming the ferrocyanide on the coating layer for capturing radioactive substances.
2. When the material for forming the coating layer of the abovementioned 1 is cationic monomer or polymer and the magnetic particle coated with this material is also coated with ferrocyanide particles, coating of the iron ferrocyanide particles proceeds easily over the magnetic particle coated with cationic monomer or polymer, by making pH of the slurry in a range of weakly acidic to strongly acidic.
3. In the step of coating the magnetic particle with cationic monomer or polymer which is the material for forming the coating layer of the abovementioned 1, coating by cationic monomer or polymer proceeds easily over the magnetic particle, by making pH of the slurry to alkaline.
4. In the abovementioned structure 1, preferably the material for forming the coating layer is cationic monomer or polymer, and after passing through the coating operation for coating the magnetic particle coated with the monomer or polymer with ferrocyanide particles, preferably, an operation of removing water from the obtained slurry and making an agglomerate of the coated magnetic particles is added. The decontaminator which is the agglomerate of the coated magnetic particles is capable of easily removing the radioactive cesium in the liquid, and can absorb, separate and recover the radioactive cesium from the liquid, when using it for the decontamination treatment in the suspension liquid containing the radioactive cesium.
5. Regarding the decontaminator which is the agglomerate of the coated magnetic particles, when a particle size distribution is measured by laser diffraction particle size distribution measurement to obtain particle size 90% ($D_{90}$), particle size 50% (average particle size) ($D_{50}$), and particle size 10% ($D_{10}$) of the cumulative particle size, it is found that the decontaminator captures the cesium in the liquid at a high efficiency if the value of the cumulative particle size distribution ($D_{90}-D_{10}$)/$D_{50}$ is less than 6 and the average particle size ($D_{50}$ diameter) is 2.0 µm or more and 100 µm or less.
6. It is also found that if the particle size ($D_{90}$) of the cumulative particle size 90% of the decontaminator is 2.0 µm or more and 100 µm or less, involvement of the fly ash by the decontaminator can be reduced, and efficiency of removing the radioactive cesium in the suspension liquid can be improved.
7. The method of separating and removing the radioactive cesium using the decontaminator includes: suspending the material to be treated containing radioactive cesium in a solvent and thereafter adding the decontaminator so that the decontaminator captures the radioactive cesium that exists in the solvent, and giving a magnetic field to the treatment liquid to recover the decontaminator that captures the radioactive cesium, from the treatment liquid. Thus, the radioactive cesium in the suspension liquid can be separated and recovered without coprecipitating a suspended material. Therefore, there is a remarkable effect of reducing the volume of the material contaminated by the radioactive substance. The following step may also be added: the material to be treated is previously suspended in the solvent and the radioactive cesium is sufficiently dissolved in the solvent before the decontaminator is added for removing the radioactive cesium, and in this state, the radioactive cesium is removed without separating the material to be treated from the solvent.

Note that water and an organic solvent including alcohol can be used as the solvent. In the present invention, a case of using water as the solvent will be described for example.

The present invention is provided based on the abovementioned knowledge, and in order to solve the abovementioned problem, a first invention provides a method of producing a radioactive cesium decontaminator, including:

suspending magnetic particles in a solvent, and coating each magnetic particle with organic monomer or polymer, to thereby form a precursor;

adding a ferrocyanide aqueous solution and an aqueous solution containing at least one kind of transition metal into a suspension liquid containing the precursor after coating while applying a strong shear force, to thereby generate a radioactive cesium decontaminator; and removing water content from a slurry containing the obtained radioactive cesium decontaminator.

A second invention provides the method of producing a radioactive cesium according to the first invention, wherein when the magnetic particle is coated with the organic monomer or polymer, coating treatment is performed by previously adding alkali into the slurry so that a liquid property is adjusted to alkaline.

A third invention provides a radioactive cesium decontaminator, which is formed by agglomeration of primary particles having a coating layer made of an organic material on a surface of a magnetic particle and having a cesium absorption component made of a ferrocyanide material on a surface of the coating layer, wherein a cumulative particle size ($D_{50}$) measured by a laser diffraction particle size distribution measurement is 2.0 μm or more and 50 μm or less, and a value of a cumulative particle size distribution ($D_{90}-D_{10}$)/$D_{50}$ is less than 6.

A fourth invention provides the radioactive cesium decontaminator according to the third invention, wherein a cumulative particle size ($D_{90}$) measured by the laser diffraction particle size distribution measurement is 5.0 or more and 150 μm or less.

A fifth invention provides the radioactive cesium decontaminator according to any one of the third to fourth inventions, wherein a primary particle size of the magnetic particle is 1 nm or more and 300 nm or less.

A sixth invention provides the radioactive cesium decontaminator according to any one of the third to fifth inventions, wherein a specific surface area value by BET method is 1 $m^2$/g or more and 150 $m^2$/g or less.

A seventh invention provides a method of removing radioactive cesium, including:
suspending a material to be treated containing radioactive cesium, a radioactive cesium decontaminator produced by the method of producing a radioactive cesium decontaminator of the first or second invention, or the radioactive cesium decontaminator of any one of the third to sixth inventions in a solvent, and making the radioactive cesium decontaminator capture radioactive cesium that exits in the solvent; and
giving a magnetic field to the solvent, and recovering the radioactive cesium decontaminator that captures the radioactive cesium from the solvent.

An eighth invention provides the method of removing radioactive cesium of the seventh invention, including:
previously suspending a material to be treated containing radioactive cesium in a solvent and dissolving the radioactive cesium in the solvent; and
adding the radioactive cesium decontaminator in the solvent without separating the material to be treated from the solvent,
before making the radioactive cesium decontaminator capture the radioactive cesium that exists in the solvent.

Advantage of the Invention

According to the present invention, a radioactive cesium decontaminator can be easily produced with high productivity, which is capable of removing radioactive substances at a high ratio and having a high environmental resistance.

Further, by using the radioactive cesium decontaminator of the present invention, volume of an incineration fly ash, etc., contaminated with radioactive cesium can be reduced.

Further, a decontaminator after recovering the radioactive cesium can be separated using a magnetic force, and a radiation exposure risk generated during operation can be reduced, and therefore the volume of the radioactive substance can be reduced safely and efficiently.

DETAILED DESCRIPTION OF THE INVENTION

<Preparation of Raw Material Powder (Magnetic Particle) (Part 1)>

After mixing an iron sulfate aqueous solution and a sodium hydroxide aqueous solution, and a temperature is raised to 70 to 100° C. so that a mixture is oxidized, to thereby form magnetite ($Fe_3O_4$) particles. The obtained slurry containing the magnetite is filtered and washed by water, to thereby obtain a magnetite cake. The obtained magnetite cake is dried for 6 hours or more at 80 to 200° C., and pulverized to thereby obtain a raw material powder (magnetic particles) as a magnetite ($Fe_3O_4$) dry powder.

If desired, the obtained magnetite powder is subjected to a reduction treatment in a gas phase for 30 minutes or more and 12 hours or less at 300 to 600° C., so that the magnetite powder may be reduced to iron particles. However, in this case, the iron particles after the reduction treatment are significantly oxidized when exposed to the atmosphere, and not withstand the treatment of forming the decontamination component. Therefore, a formation treatment of the oxide film is performed in a gas containing oxygen at 50 to 200° C. for 30 minutes or more and 12 hours or less, and thereafter the magnetite powder is taken out in the atmosphere to obtain the raw material powder (magnetic particles).

<Preparation of the Raw Material Powder (Magnetic Particles) (Part 2)>

An aqueous solution of an iron salt, and optionally a cobalt salt solution are respectively added into pure water, to thereby obtain a solution. Then, aluminum sulfate and optionally a rare earth compound solution are added into this solution while blowing air thereinto, to thereby obtain an acicular-type iron oxyhydroxide (goethite: α-FeOOH) containing at least aluminum.

The obtained iron oxyhydroxide is dehydrated by heating in the atmosphere, to thereby generate α-iron oxide (hematite: α-$Fe_2O_3$), and thereafter the obtained α-iron oxide is subjected to reduction treatment by heating it in a hydrogen atmosphere, for example at a temperature of 300 to 650° C. Subsequently, gas containing oxygen is added into the heated atmosphere of 200° C. or less, to thereby form an oxide film on the surface of the α-iron which is subjected to the abovementioned reduction treatment. The iron particles thus obtained can also be the raw material powder (magnetic particles).

<Formation of a Coating Layer Over the Raw Material Powder (Magnetic Particle)>

The obtained raw material powder is added into the pure water and the mixture is stirred, to thereby obtain raw material powder slurry. Stirring here may be performed so that the raw material powder is dispersed without being precipitated. The obtained slurry is made to alkaline slurry by adding aqueous ammonia or aqueous sodium hydroxide into the slurry.

A cationic monomer or polymer is added into the slurry which is adjusted to alkaline, to thereby form on a particle surface a coating layer of monomer or polymer having cationic property. Stirring in this stage is not necessarily required to be a strong stirring, and may be the stirring so that the raw material powder (magnetic particles) is dispersed without being precipitated. However, when the step of forming ferrocyanide is continuously performed after cationic monomer or polymer is formed, there is no problem in causing a reaction to occur while adding a strong shear force. Further, even in the case of a normal stirring, coating can be made by ultrasonic treatment, depending on a treatment scale.

The addition amounts of the cationic monomer or polymers into the solution, are 10 wt % or less, preferably 5 wt % or less, and further preferably 2 wt % or less, as a solid content in terms of pure polymer or monomer with respect to a treatment liquid. Increase of a viscosity can be prevented by setting the solid content to 10 wt % or less, and this is preferable because coating over the particle can be uniform.

When cationic monomer or polymer is used in the present invention, monomer or polymer having cationic group, or monomer or polymer having a group capable of imparting cationic property by ionizing, can be used, and not particularly limited. Also, in the cationic monomer or polymer used in the present invention, a part of a main chain may show the cationic property, or side-chain substituents combined to a main chain may show the cationic property.

When the cationic monomer is used in the present invention, vinyl monomer having a primary amino-group, vinyl monomer having a secondary amino-group, vinyl monomer having a tertiary amino-group, and vinyl monomer having a quaternary ammonium salt group, etc., can be given.

Further, when the cationic polymer is used in the present invention, cationic property may be imparted to synthetic polymer, or cationic property may be imparted to natural or microbial derived polymers such as cationized cellulose, cationized starch, cationized dextran, cationized guar gum, and cationized chitosan, etc.

The following operation may also be performed: the particle having a coating layer of cationic monomer or polymer on its surface is separated from a reaction solution so that powder may be washed. By this operation, excess monomer or polymer, or residual ammonia is removed. When such a separating operation is performed, methods such as a separation using magnetism, decantation, or filtration, etc., are employed for example. After separation, preferably a suspension liquid is obtained again by adding pure water, and an excess component is preferably removed, which is adhered to the particle several times. As a reference point of washing, washing is preferably performed until 10 or less of pH, more preferably 9.5 or less of pH in the dispersion liquid.

Note that whether or not the surface of the particle can be coated with polymer or monomer by a series of reaction, can be confirmed by measuring a zeta potential of the particle, or measuring a carbon content of a particle dried body.

<Formation of a Radioactive Substance Capturing Layer Over the Particle>

The slurry of the particle subjected to coating after washing, is stirred again to disperse particles, and thereafter a water-soluble ferrocyanide such as sodium salt or potassium salt, and a metal compound containing at least a kind of transition metals such as Ni, Fe, Co, Cu, and Zn, are sequentially added, to thereby form an insoluble decontamination component on an organic coating layer or in the coating layer. When such an addition is performed, the ferrocyanide and the metal compound are preferably water-soluble substances respectively. In the stage of the addition/coating of the ferrocyanide and the transition metal, coating must be performed by efficiently making the particles and the generated product brought into contact with each other, and therefore the particles are dispersed using a disperser having a high shear force and by adding the strong shear force to the slurry.

As the disperser having a strong shear force, T.K. homomixer (registered trademark) by PRIMIX Corporation known as a turbine stator type stirrer, and Ultra-Turrax (registered trademark) by IKA Corporation, etc., can be given for example, and as a colloid mill, T.K. MYCOLLOIDER (registered trademark) by PRIMIX Corporation, T.K. Homomic Line Mill (registered trademark), and T.K. High Line Mill (registered trademark) by PRIMIX Corporation, and a Static mixer (registered trademark), High pressure microreactor (registered trademark), High pressure homogenizer (registered trademark), etc., by Noritake Company Limited, can be given for example.

Strength of the shear force can be evaluated by a peripheral speed of a stirring blade if an apparatus has the stirring blade, and the "strong shear force" is the force expressed by the blade peripheral speed of 3.0 (m/s) or more, preferably 5.0 (m/s) or more, and further preferably 10.0 (m/s) or more. If the blade peripheral speed is 3.0 (m/s) or more, the shear force added on the solution is sufficient, and the ferrocyanide can be sufficiently adhered to the surface of the organic coating layer. As a result, a sufficient cesium adsorption amount can be secured in the produced decontaminator, and therefore a radioactivity removal performance in a suspension liquid of a material to be treated can be preferably secured. Further, although detailed reason is not clear, a cumulative particle size distribution of the decontaminator expressed by a value of $(D_{90}-D_{10})/D_{50}$ becomes small of less than 6 by the treatment using the strong shear force. As a result, it is found that the cumulative particle size distribution at the time of drying the generated decontaminator, is in the abovementioned preferable range.

Further, by adding a sufficient shear force, the ferrocyanide can be strongly adhered to the surface of the organic coating layer. If the ferrocyanide is strongly adhered to the surface of the organic coating layer, for example, the ferrocyanide containing radioactive cesium can be prevented from peeling off from the surface of the particle of the decontaminator, when a stirring operation is performed for stirring the mixture of the produced decontaminator and the material to be treated. If the ferrocyanide containing radioactive cesium is peeled off from the surface of the particle of the decontaminator, there is a possibility that the radioactive cesium in the suspension liquid of the material to be treated cannot be recovered later by magnetic separation performed later, and a cyanide compound is also remained in the suspension liquid of the material to be treated, and this is not preferable.

The abovementioned blade peripheral speed can be calculated by circular constant×diameter (m) of a turbine blade×the number of rotations of stirring (rotation number) per 1 second. For example, when the diameter of the turbine blade is 3.0 cm (0.03 m) and the number of rotations of a blade is 8000 rpm, the number of rotations per 1 second is 133.3 (rps) and the blade peripheral speed is 12.57 (m/s).

In this step, whether or not the adhesion of the ferrocyanide is appropriately performed, can be confirmed.

Specifically, a portion of the slurry after this step may be extracted to put it in a vessel and placed on a magnet. Since the decontaminator attracted to the magnet and a supernatant are separated, whether or not the adhesion is appropriately performed can be confirmed by confirming the coloring of the supernatant. For example, when iron ferrocyanide is adhered to the decontaminator and such an adhesion is not appropriately performed, the iron ferrocyanide that fails in adhesion is floated or dissolved in the supernatant, thus coloring the supernatant in Prussian blue. Meanwhile, when the iron ferrocyanide is appropriately adhered to the decontaminator, the decontaminator colored in Prussian blue is attracted to the magnet and precipitated, and therefore the supernatant shows colorless and transparent.

As an example of an apparatus for confirming a sufficient coating, a sample bottle having a capacity of 3 mL is employed as a bottle for encapsulating the slurry, and a magnetic circuit (EP001: surface magnetic flux density of 300 mT) by 26 magnet corporation, can be used for example. Whether or not the ferrocyanide can be adsorbed on the magnetic powder can be judged by adding the slurry into the sample bottle, installing the sample bottle in the center of the magnetic circuit after putting a lid on the sample bottle, and horizontally sucking the decontaminator.

Note that an end point of the reaction may be confirmed by repeating the sampling of the slurry several times, and confirming an adhesion state of the ferrocyanide, using the abovementioned confirmation method.

Water content is removed from the slurry coated with the ferrocyanide obtained as described above, to thereby obtain an aggregate coated with the ferrocyanide. A method of obtaining the aggregate is not particularly limited, and a method of drying after filtration or decantation, and magnetic separation, and spray dry, vacuum freeze dry, and vacuum oven, etc., can be used for example. The dried body thus obtained may be processed into powder through a pulverization step as needed.

When a "particle having a large particle size" is included in the obtained powder, a step of removing it is preferably added. The "particle having a large particle size" called in the present invention means the powder with a particle size of 200 µm or more. Such a "particle having a large particle size" is easily attracted to the magnet, but the particle itself has a weight and therefore when a stirring strength is weak during a removing operation, there is a possibility that the decontaminator particle itself is precipitated. In this case, since the dispersion of the decontaminator in the liquid is insufficient, thus lowering an efficiency of using the decontamination component in the liquid, resulting in lowering a decontamination effect in a short time, and this is not preferable.

In order to previously remove the "particle having a large particle size", it can be reduced or removed by a publicly-known sieving or classification operation, etc. However, the sieving is not required in some cases by using a spray dryer method for example, because a fine particle can be produced.

<Radioactive Cesium Decontaminator>

The decontaminator of the present invention has a structure in which a coating layer composed of an organic material is formed over a magnetic particle so that a cesium capturing substance composed of ferrocyanide is carried on the coating layer. Then, the cesium decontaminator preferably has the following property.

As an average primary particle size of the magnetic particle which is a core material, specifically 1 nm to 2 µm, preferably 10 nm to 1 µm, and further preferably 10 to 500 nm are preferable. Although the form of the particle does not affect the effect of the invention, any one of the forms of spherical, acicular-type, plate-like, cubic, spindle-shaped, rectangular parallelepiped shaped, or the form similar thereto, may be acceptable. Note that the average primary particle size of the magnetic particle can be measured by a transmission electron microscope (TEM) photograph.

The coating layer is preferably made of the polymer or monomer having cationic property from a viewpoint of adhesion stability to the magnetic particle. Further, a cesium absorption component composed of ferrocyanide is included in at least a part of the coating layer. The cesium absorption component may also be included in not only on the coating layer but also in a part of the coating layer. As a suitable ferrocyanide, substances having a cesium adsorption or exchange performance such as iron ferrocyanide (Prussian blue), nickel ferrocyanide, copper ferrocyanide, cobalt ferrocyanide, or compounds of these ferrocyanide and alkali metal (for example, nickel potassium ferrocyanide, etc.) can be used. Above all, from a viewpoint of increasing alkaline property when treatment is applied to the fly ash, nickel ferrocyanide or the alkali metal compound thereof (for example, nickel potassium ferrocyanide, etc.) is preferably used. However, iron ferrocyanide may also be used under a condition that pH adjustment by hydrochloric acid is allowable.

The decontaminator of the present invention is preferably in the form of an aggregate in which not a single particle but several or more particles are assembled in a bulk. As described above, if the decontaminator is formed into the aggregate of the particles having a value of cumulative particle size distribution $(D_{90}-D_{10})/D_{50}$ of less than 6, which is calculated from 10% particle size ($D_{10}$), 90% particle size ($D_{90}$), and average particle size (50% particle size) ($D_{50}$) in the cumulative particle size distribution obtained by laser diffraction particle size distribution measurement, it is found that the decontaminator is the decontaminator having excellent cesium adsorption ability.

Details are not clarified regarding why the particle size distribution of the aggregate has an influence on the adsorption ability of cesium. However, according to an examination by the inventors of the present invention, the particle size distribution has a preferable influence on the decontamination ability if the value of $(D_{90}-D_{10})/D_{50}$ is less than 6, preferably less than 5.5, and further preferably 2.0 or less.

Further, the average particle size ($D_{50}$) of the decontaminator of the present invention obtained by the laser diffraction particle size distribution measurement method, is preferably 2.0 µm or more and 50 µm or less. This is because if 50% cumulative particle size ($D_{50}$) is 2.0 µm or more, separation is easy between the decontaminator and the suspension material in the liquid even in a case that a suspension component such as fly ash coexists, and this is preferable. Meanwhile, if 50% cumulative particle size ($D_{50}$) is 50 µm or less, efficient dispersion easily occurs in the liquid, and efficiency of decontamination can be maintained, and this is preferable.

Further preferably, 90% cumulative particle size ($D_{90}$) is 5.0 µm or more, 150 µm or less, more preferably 100 µm or less, and further preferably 75 µm or less.

If 90% cumulative particle size ($D_{90}$) is 5.0 or more, separation is easy between the decontaminator and the suspension material in the liquid even in a case that a suspension component such as fly ash coexists, and this is preferable. Meanwhile, if 90% cumulative particle size ($D_{90}$) is 100 μm or less, dispersion of the decontaminator hardly occurs and efficient dispersion is facilitated in the suspension liquid, and efficiency of decontamination can be maintained.

A specific surface area of the obtained decontaminator obtained by BET method is 1 $m^2/g$ or more, preferably 5 $m^2/g$ or more, and further preferably 10 $m^2/g$ or more. Note that the value of the specific surface area is the value measured not through a usually performed degassing operation because there is a possibility that the ferrocyanide for toting the surface is decomposed. When the specific surface area has a value smaller than this value, an area in contact with a treatment liquid becomes small, thus lowering the decontamination efficiency, and this is not preferable. When the BET value is excessively large, the particle size is supposed to be small, and there is a problem that coprecipitation with the material to be treated occurs, and this is not preferable. Specifically, the value of the specific surface area is 400 $m^2/g$ or less, preferably 150 $m^2/g$ or less, and further preferably 100 $m^2$/or less.

<Method of Removing Radioactive Cesium from Incineration Fly Ash>

Explanation is given for a method of removing a radioactive substance from a substance containing the radioactive substance.

Here, a method of removing radioactive cesium from an incineration fly ash containing radioactive cesium, will be described for example.

First, radioactive cesium is eluted in the water by adding a fly ash containing radioactive cesium into the water and stirring the mixture. When the fly ash is suspended in the water, pH of the liquid is increased to strong alkaline (about 12), and therefore pH may be adjusted using acid such as hydrochloric acid for improving stability of the ferrocyanide. By setting pH to 11 or less, preferably 10 or less, and further preferably 9 or less, isolation of a cyanide from the ferrocyanide can be suppressed after adding the decontaminator, and an amount of the cyanide in the water after removal can be suppressed. The mixture after adding the fly ash is preferably stirred for 2 hours or more and more preferably 4 hours or more.

Previously prepared decontaminator is added into the liquid in which fly ash is suspended, at a weight ratio of 0.01 wt % or more based on a fly ash weight, and stirring is continued. An addition amount of the decontaminator may be larger than the amount of the fly ash, and the radioactive cesium in the liquid can be sufficiently recovered even when the addition is about 0.1 wt % in the case of the decontaminator of the present invention. Although depending on the volume of the liquid to be treated, as the time required for the treatment after adding the decontaminator, the treatment of about 15 minutes or more and preferably 30 minutes or more may be performed in the case of the suspension liquid of the material to be treated having the volume of about 10 L.

Thereafter, magnetic force is added on the liquid after treatment, to thereby adsorb the decontaminator on which cesium is adsorbed. Regarding the generation of the magnetic force used at this time, it is more suitable to introduce a technique of controlling the generation of the magnetic force from outside than a case of always releasing the magnetic force, because the decontaminator that captures the radioactive substance therein can be recovered by remote control. The recovered decontaminator is sealed and stored in a publicly-known container having a structure not allowing the radioactive substance to leak to outside, to thereby discard (store) the recovered substance as a high concentration radioactive substance.

The liquid after recovering the decontaminator, is passed through the filter, etc., and subjected to solid-liquid separation by recovering the fly ash suspended in the liquid. Any one of the publicly-known methods may be used for the solid-liquid separation. Further, a closed system may be constructed for treated water by circulating and reusing the separated and recovered water for a dispersion liquid in which the fly ash is dispersed. Then, the fly ash after completion of washing, is passed through the step of confirming radioactivity and subjected to landfill processing.

<Evaluation of the Decontaminator Particle>

The obtained decontaminator is evaluated based on the method of the present invention.

<Particle Form>

The form of the aggregates of the decontaminator particles is confirmed by field emission scanning electron microscope (S-4700 produced by Hitachi High-Technologies Corporation) at a magnifying power of 500 to 60,000.

<Qualitative Analysis>

Whether or not the ferrocyanide is formed on the surface of the decontaminator particle, is evaluated as follows: Co tube in the RINT-2100 produced by Rigaku Corporation is used for the measurement in a range of $2\theta=10$ to $70°$, and an obtained diffraction line is compared with a JCPDS card chart, to thereby perform qualitative evaluation including the form of the ferrocyanide if the ferrocyanide exists.

In example 1, example 7, example 8, and comparative example 2 described later, an amount of elements contained in the decontaminator is confirmed using X-ray fluorescence analyzer (RIX-2000 produced by Rigaku Corporation).

<Average Particle Size, Particle Size Distribution>

An average particle size and a particle size distribution of the aggregate of the decontaminator particles, are measured under condition of lens diameter of 200 mm, using a laser diffraction particle size distribution measuring device (HELOS&RODOS-KF produced by SYMPATEC Ltd.).

<Specific Surface Area>

The specific surface area of the aggregates of the decontaminator particles by BET method, is expressed by a value measured by a single point method, using 4 Sorb of Yuasa Ionics Co. However, cyanide is adhered to this sample, and the cyanide is likely to be decomposed by degassing by heating, and therefore measurement is performed without performing degassing operation.

<Adsorption Ability of Stability Cesium of the Decontaminator Particles>

The cesium adsorption ability of the decontaminator particle is confirmed as follows. After pH is adjusted to 10.7, cesium sulfate is dissolved in the solution so that about 100 ppm is contained as stability cesium. Solution 100 g after dissolving is poured in 200 mL beaker, and decontaminator powder 0.1 g prepared in example, etc., is added thereinto, and the mixture is stirred under condition of 30 minutes at 250 rpm and at a normal temperature. A residual amount of cesium in the solution from which the decontaminator is recovered by magnetic separation, is confirmed by ICP emission spectrometry (high frequency induction plasma emission spectrometer (using (IRIS/AP) produced by Nippon Jarrell Ash Corp.), and confirmed by formula (1).

Removal rate (%)=(concentration before test−concentration after test)/concentration before test× 100    Formula (1)

Adsorption (absorption) behavior of the stability cesium and the radioactive cesium on the ferrocyanide is considered to be approximately the same. Therefore, this evaluation enables to obtain information regarding how much power can be obtained in adsorbing the cesium of a constant concentration (about 100 ppm) in a specific time (30 minutes).

<Evaluation of Cesium Removing Power from the Fly Ash>

The cesium absorption power of the decontaminator particle is evaluated as follows. Pure water is added into the fly ash, and thereafter the mixture is stirred for a specific time so that the cesium contained in the fly ash is dissolved in the solution, and water is further added thereinto. Then, pH of the solution is adjusted to pH=10.7 with hydrochloric acid, and the liquid is divided as needed and the radioactivity of the liquid is measured using a NaI scintillator (MUCHA produced by Raytest Co.), to thereby obtain the radioactivity before decontamination. After measurement, the decontaminator of a specific amount is added, and the mixture is stirred for a specific time of 1 hour to 24 hours so that the cesium in the liquid is adsorbed on the decontaminator particle, then the decontaminator is removed by magnetic separation, and the radioactivity of the liquid is measured using the NaI scintillator similarly to the case before operating the radioactivity in the liquid, to thereby calculate the amount of the removed radioactivity.

The mixing ratios of the fly ash and the decontaminator, and the stirring time, etc., are respectively described in examples and comparative examples described later.

EXAMPLE

Example 1

In 1000 mL scale container, 20 g of magnetite with BET: 20 m$^2$/g (primary particle size of 60 nm) was added into 570 mL of pure water, and the mixture was stirred so that particles were dispersed at 8000 rpm for 30 minutes at a normal temperature, to thereby obtain magnetic powder slurry.

Ammonia water (concentration: 21.3 wt %) 15 mL was added into the obtained magnetic powder slurry so that pH was alkaline. Then, PDDA 15 g (solid portion 3.0 g as PDDA) was added into the magnetic powder slurry, and the mixture was stirred at 240 rpm for 30 minutes at normal temperature, to thereby make the PDDA adhered to the magnetic powder particles. Note that the PDDA (poly diallyl dimethyl ammonium chloride) having a molecular weight of 10 to 150,000, having a solid content of 20 wt %, and produced by Sigma Aldrich Corporation was used.

The obtained magnetic powder slurry was placed on the magnet, and PDDA-coated magnetic particles were precipitated from the slurry, and thereafter supernatant was removed, and excess PDDA and ammonia component were removed, to thereby obtain a precipitate.

Pure water was added into the obtained precipitate to prepare a slurry of 400 mL, and this slurry was stirred to dissolve an impurity in the liquid. The slurry was placed on the magnet again, and the PDDA-coated magnetic powder particles were precipitated from the slurry, and the supernatant was removed, and excess PDDA and ammonia component were removed again, to thereby obtain the precipitate.

When the abovementioned washing operation was repeated three times, pH value of the slurry became 8.6, and conductivity showed 8.5 mS/m. Also, when a portion of the slurry was collected to confirm carbon content, carbon of 0.5 wt % was detected.

The slurry was stirred for 30 minutes at 8000 rpm (blade peripheral speed: 12.57 m/s) at normal temperature by a disperser having a high shear force (TK Homomixer Mark II produced by PRIMIX Co., Ltd), to thereby disperse the magnetic powder.

Potassium ferrocyanide aqueous solution (containing potassium ferrocyanide trihydrate 24.45 g), and a nickel sulfate aqueous solution (containing nickel sulfate hexahydrate 19.99 g) were respectively added into the magnetic powder slurry subjected to dispersion treatment, and the mixture was stirred at 8000 rpm for 30 minutes at normal temperature by a disperser having a shear force (TK homomixer-MarkII produced by PRIMIX Co., Ltd). By this operation, a nickel ferrocyanide coating film was formed on the surface of the PDDA-coated magnetic powder particles, to thereby obtain the slurry of the decontaminator particles of example 1. When a portion of the obtained slurry was sampled and placed on the magnet, the decontaminator component and the supernatant were immediately separated, and the supernatant after separation showed a colorless and transparent clear liquid.

Figure 1:
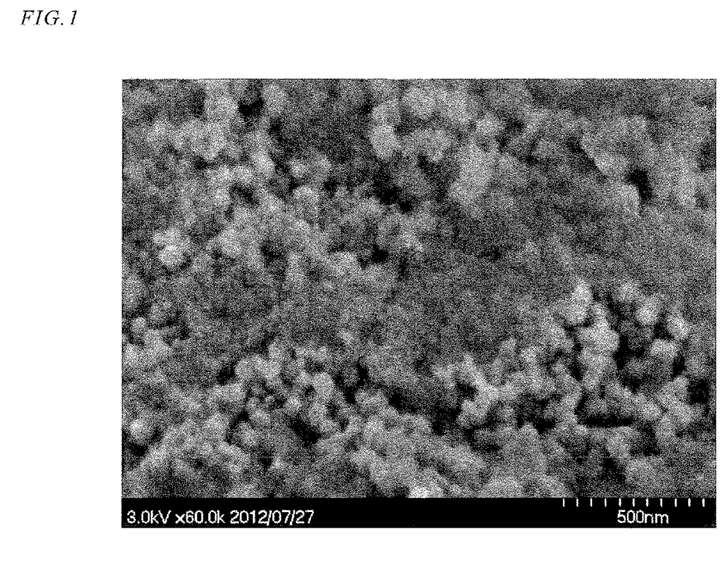
FIG. 1 is a SEM image of a decontaminator according to example 1 of the present invention.

The obtained slurry of the decontaminator particles was sucked and filtered in the atmosphere so that a decontaminator particle cake and a reaction solution were separated from each other, and the obtained decontaminator particle cake was dried at 100° C. in the atmosphere for 6 hours, to thereby obtain a dried body of the decontaminator particles. The obtained dried body of the decontaminator particles was pulverized by a mortar, to thereby obtain a dye powder. When a SEM image of the obtained powder was confirmed, the image as shown in FIG. 1 was obtained, and BET value of the obtained powder was 62.6 m$^2$/g.

Figure 2:
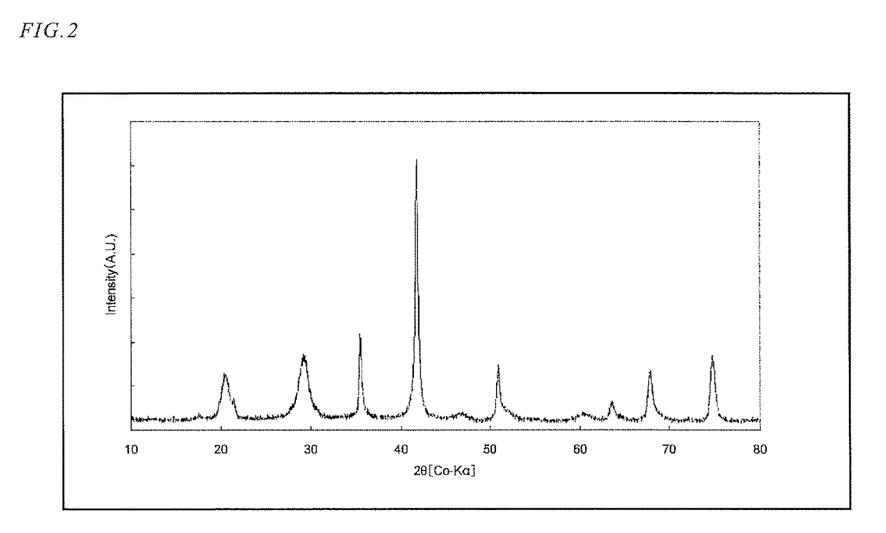
FIG. 2 is XRD of the decontaminator according to example 1 of the present invention.

When the obtained decontaminator powder was evaluated using XRD, a sharp diffraction line was confirmed, and when such a sharp diffraction line was identified by JCPDS card, it was confirmed that this was a peak caused by nickel ferrocyanide and magnetite. The obtained XRD diffraction pattern was shown in FIG. 2. Also, when the obtained decontaminator was subjected to quantitative analysis by X-ray fluorescence, atomic weight ratio of nickel/iron was 0.30. Further, the adsorption ability (cesium removing ability) of the obtained particle for adsorbing the stability cesium, was 60.6%, and the decontaminator powder had a high adsorption property.

Next, the test of making the cesium in the liquid adsorbed on the decontaminator, was carried out as follows: pure water 615 mL was added into fly ash 61.5 g, and thereafter the mixture was stirred for 24 hours to dissolve therein the cesium contained in the fly ash, and water 750 mL was added, and thereafter pH of the solution was adjusted to 10.7 with hydrochloric acid, then the liquid was divided into three parts, and the decontaminator 0.14 g was added and the mixture was stirred for 20 minutes, so that the cesium in the liquid was adsorbed on the decontaminator. Then, it was confirmed that 44.9% radioactivity was reduced, and the decontaminator had a high decontamination ability.

Also, the test of making the cesium in the liquid adsorbed on the decontaminator powder, was carried out as follows: pure water 400 mL was added into fly ash 40.0 g, and thereafter the mixture was stirred for 24 hours to dissolve therein the cesium contained in the fly ash, and pH of the solution was adjusted to 10.7 with hydrochloric acid, and thereafter, the decontaminator 40.0 mg{decontaminator/fly ash:1/1000 (weight ratio)} was added and the mixture was stirred for 1 hour to cause a reaction, so that the cesium in the liquid was adsorbed on the decontaminator. Then, it was confirmed that 45.6% radioactivity was reduced, when the radioactivity of the unreacted fly ash dispersion liquid was 100%.

The result is shown in table 2.

Example 2

The decontaminator powder was obtained by an operation similar to example 1, excluding a point that the coated magnetic powder was changed to iron fine particles (primary particle size: 50 nm). BET value of the obtained powder was 78.3 $m^2/g$. The cesium adsorption ability of the obtained particle was 53.1%, and the particle had a high adsorption property. Also, the test of making the cesium in the liquid adsorbed on the decontaminator, was carried out as follows using the obtained decontaminator: pure water 531 mL was added into fly ash 53.1 g, and thereafter the mixture was stirred for 4 hours to dissolve therein the cesium contained in the fly ash, and water 531 mL was added, and thereafter pH of the solution was adjusted to 10.7 with hydrochloric acid, then the liquid was divided into two parts, and the decontaminator 0.26 g was added and the mixture was stirred for 20 minutes, so that the cesium in the liquid was adsorbed on the decontaminator. Then, it was confirmed that 65.9% radioactivity was reduced.

Example 3

The decontaminator powder was obtained by preparing a decontaminator slurry by operation similar to example 1, excluding a point that as a component added into the magnetic powder slurry subjected to dispersion treatment, potassium ferrocyanide aqueous solution (24.45 g was contained as potassium ferrocyanide trihydrate), and iron chloride aqueous solution (29.23 g was contained as iron chloride (produced by Wako Pure Chemical Industries, Ltd., were respectively added, and the mixture was stirred at 8000 rpm for 30 minutes at normal temperature, When a portion of the obtained slurry was extracted and poured into a container and placed on the magnet, it was confirmed that the supernatant showed a colorless and transparent appearance. Therefore, it was found that iron ferrocyanide was sufficiently adhered on the decontaminator powder.

The BET value of the obtained decontaminator powder was 64.3 $m^2/g$.

The stability cesium adsorption ability of the obtained decontaminator powder was 53.8%.

The result is shown in table 1.

When the obtained decontaminator powder was evaluated using XRD, a sharp diffraction line was confirmed, and when such a sharp diffraction line was identified by JCPDS card, it was confirmed that this was a peak caused by iron ferrocyanide and magnetite.

Example 4

Pure water 540 g was poured into a beaker of 1000 mL, and needle-like particles 30 g (cobalt/iron=3.0 at %) having an average major axis length of 235 nm and produced by DOWA Electronics Materials Co., Ltd. were added as a raw material powder containing the magnetic particles. Then, the mixture was emulsified so that the particles were dispersed at 8000 rpm for 30 minutes using a fast emulsifying disperser (TK homomixer Mark II produced by PRIMIX Co., Ltd), to thereby obtain a dispersion slurry of the raw material powder.

Ammonia water 2.5 g having a concentration of 21.3% was added into the raw material powder slurry, and pH of the solution was changed to basic, and thereafter PDDA 0.50 g (solid portion: 39 wt %) was added, and the mixture was emulsified so that the particles were dispersed again at 8000 rpm for 30 minutes by the abovementioned disperser, to thereby obtain the slurry of the magnetic particles having a coating layer of PDDA formed thereon.

Potassium ferrocyanide aqueous solution of 0.5 mol/L: 160 g and nickel sulfate aqueous solution of 0.49 mol/L: 220 g were respectively added into the slurry of the obtained magnetic particles having the coating layer thereon, and the mixture was continued to be emulsified at 8000 rpm for 30 minutes by the abovementioned disperser, so that the nickel ferrocyanide was adhered to the surface of the magnetic particle having the PDDA coating layer formed thereon to thereby obtain the decontaminator particle, and obtain the slurry (concentration of the solid portion: about 10 wt %) containing the decontaminator particles.

When a portion of the obtained slurry was extracted and poured in the container and placed on the magnet, it was confirmed that the supernatant liquid showed colorless and transparent. Therefore, it was found that the nickel ferrocyanide was sufficiently adhered on the decontaminator particles.

The obtained slurry containing the decontaminator particles was sprayed using a disk-type spray drier (L-12 type spray dryer produced by Okawara machine Co., Ltd.) under conditions of inlet temperature: 240° C., disk rotation speed: 20000 rpm, and feed rate of the slurry: 180 g/min, to thereby obtain the aggregate of the decontaminator particles.

The obtained aggregate of the decontaminator particles was recovered using a cyclone. Then, the aggregate of the decontaminator particles recovered by the cyclone were the decontaminator powder of example 4.

BET value of the decontaminator of example 4 was 52.9 $m^2/g$.

The adsorption ability of the stability cesium of the obtained particles of the decontaminator of example 4 was 60.9%, and the decontaminator had high adsorption property.

In example 4, the test of making the cesium in the liquid adsorbed on the decontaminator, was carried out as follows: pure water 400 mL was added into fly ash 40.0 g, and thereafter the mixture was stirred for 24 hours to dissolve therein the cesium contained in the fly ash, and thereafter pH of the solution was adjusted to 10.7 with hydrochloric acid, then the decontaminator 40.0 mg {decontaminator/fly ash: 1/1000 (weight ratio)} was added, and the mixture was stirred for 24 hours to cause a reaction, so that the cesium in the liquid was adsorbed on the decontaminator. Then, it was confirmed that 73.4% radioactivity was reduced when the radioactivity of the unreacted fly ash dispersion liquid was 100%.

The result was shown in table 3.

Figure 3:
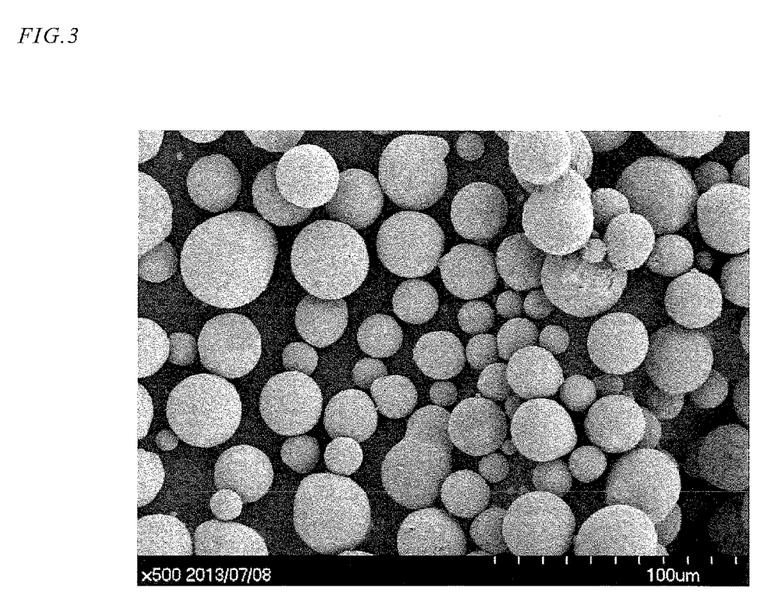
FIG. 3 is a SEM image of a decontaminator according to example 4 of the present invention.

The SEM image (500 magnifying powers) of the decontaminator of example 4 is shown in FIG. 3.

Example 5

The aggregate of the decontaminator particles was obtained by a similar production method as example 4.

The obtained aggregate of the decontaminator particles was recovered using the cyclone. At this time, the decontaminator particles recovered under a chamber were the decontaminator powder of example 5.

The BET value of the decontaminator of example 5 was 60.6 m²/g.

The adsorption ability of the stability cesium of the obtained particles of example 5 was 57.4%, and the decontaminator had high adsorption property.

When a decontamination percentage was confirmed by a similar treatment as example 4, it was confirmed that 71.9% radioactivity was reduced, when the radioactivity of the unreacted fly ash dispersion liquid was 100%.

The result is shown in table 3.

Figure 4:
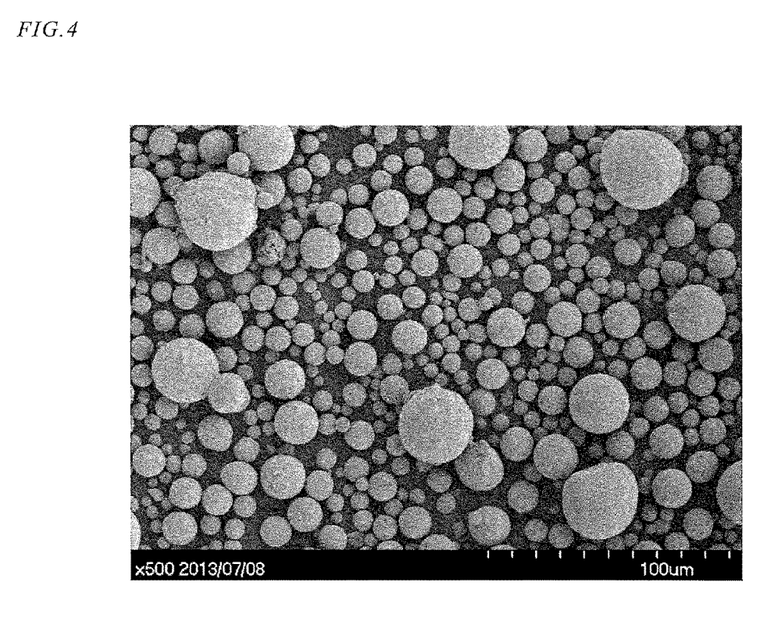
FIG. 4 is a SEM image of a decontaminator according to example 5 of the present invention.

The SEM image (500 magnifying powers) of the decontaminator of example 5 is shown in FIG. 4.

Example 6

The aggregate of the decontaminator particles was obtained by a similar production method as example 4. The aggregate of the obtained decontaminator particles was recovered using the cyclone. At this time, the decontaminator particles recovered in the cyclone and under the chamber were the decontaminator powder of example 6.

The BET value of the decontaminator of example 6 was 54.8 m²/g.

The adsorption ability of the stability cesium of the obtained particles of the decontaminator of example 6 was 44.5%, and the decontaminator had high adsorption property.

When decontamination percentage was confirmed by a similar treatment as example 4, it was confirmed that 73.8% radioactivity was reduced, when the radioactivity of the unreacted fly ash dispersion liquid was 100%.

The result is shown in table 3.

Figure 5:
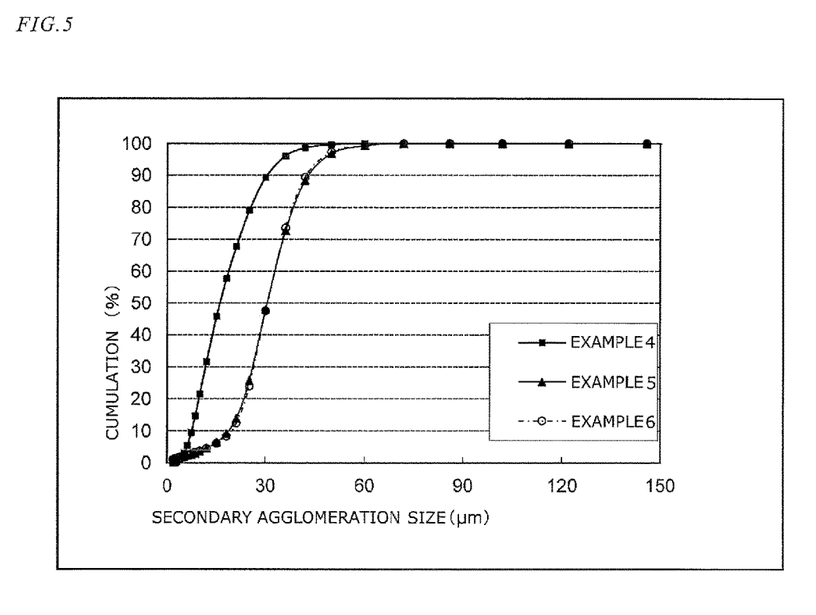
FIG. 5 is a particle size distribution of the decontaminators according to examples 4, 5, and 6 of the present invention.

The decontaminator of example 6, and a graph of the cumulative particle size of the aggregate of the decontaminator of examples 4 and 5, is shown in FIG. 5.

Example 7

When stirring at 8000 rpm for 30 minutes at normal temperature in example 1, the aggregate of the decontaminator particles of example 7 was obtained by performing the operation similar to the operation of example 1 excluding a point that the number of rotation of stirring was set to 4000 rpm.

The BET value of the decontaminator of example 7 was 54.3 m²/g.

Figure 6:
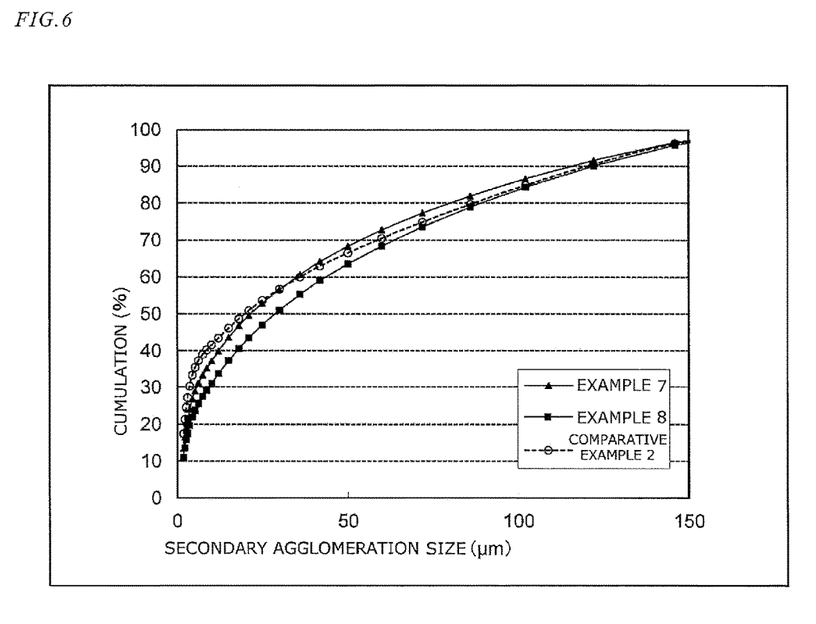
FIG. 6 is a particle size distribution of decontaminators according to examples 7 and 8, and comparative example 2 of the present invention.

Further, the decontaminator of example 7, and the graph of the cumulative particle size of the aggregate of the decontaminator of example 8 and comparative example 2, is shown in FIG. 6.

Further, when the obtained decontaminator was subjected to quantitative analysis by X-ray fluorescence, atomic weight ratio of nickel/iron was 0.31. Further, the adsorption ability (cesium removing ability) of the obtained particle for adsorbing the stability cesium, was 57.9%, and the decontaminator had a high adsorption property.

Further, the test of making the cesium in the liquid adsorbed on the decontaminator, was carried out as follows: pure water 400 mL was added into fly ash 40.0 g, and thereafter the mixture was stirred for 24 hours to dissolve therein the cesium contained in the fly ash, and thereafter pH of the solution was adjusted to 10.7 with hydrochloric acid, and the decontaminator 40.0 mg {decontaminator/fly ash:1/1000 (weight ratio)} was added and the mixture was stirred for 1 hour to cause a reaction so that the cesium in the liquid was adsorbed on the decontaminator. Then, it was confirmed that 42.0% radioactivity was reduced, when the radioactivity of the unreacted fly ash dispersion liquid was 100%.

The result is shown in table 2.

Example 8

In stirring at 8000 rpm for 30 minutes at normal temperature in example 1, the aggregate of the decontaminator particles of example 8 was obtained by performing the operation similar to the operation of example 1 excluding a point that the number of rotation of stirring was set to 2000 rpm.

The BET value of the decontaminator of example 8 was 64.0 m²/g.

Further, when the obtained decontaminator was subjected to quantitative analysis by X-ray fluorescence, atomic weight ratio of nickel/iron was 0.27. Further, the adsorption ability (cesium removing ability) of the obtained particle for adsorbing the stability cesium, was 45.3%, and the decontaminator had a high adsorption property. Also, when the decontamination test was tried from the fly ash under the conditions similar to the conditions of example 7, it was confirmed that 39.5% radioactivity was reduced.

The result is shown in table 2.

Example 9

The slurry obtained in example 6 was filtered by No. 5 filter paper, and thereafter dried at normal temperature under nitrogen, and pulverized by an agate mortar. The value of the obtained particle ($D_{50}$) was 52.3 μm.

The adsorption ability of the stability cesium of the obtained particles of the decontaminator of example 9 was 41.3%, and the decontaminator had a high adsorption property.

Further, the test of making the cesium in the liquid adsorbed on the decontaminator, was carried out as follows: pure water 400 mL was added into fly ash 40.0 g, and thereafter the mixture was stirred for 24 hours to dissolve therein the cesium contained in the fly ash, and pH of the solution was adjusted to 10.7 with hydrochloric acid, and thereafter, the decontaminator 40.0 mg {decontaminator/fly ash:1/1000 (weight ratio)} was added and the mixture was stirred for 24 hours to cause a reaction, so that the cesium in the liquid was adsorbed on the decontaminator. Then, it was confirmed that 47.9% radioactivity was reduced, when the radioactivity of the unreacted fly ash dispersion liquid was 100%.

The result is shown in table 3.

Comparative Example 1

In example 3, a removal operation was performed in the slurry state without removing water content from the slurry of the obtained decontaminator particles. In this case, the fly ash as a target is involved, and a volume reduction cannot be achieved.

Further, a portion of the obtained slurry was extracted and poured in the container, and placed on the magnet so that the decontaminator was precipitated. Then, Prussian blue coloration was observed in the supernatant, and sufficient adhesion of the iron ferrocyanide was not found.

The result is shown in table 1.

Comparative Example 2

In example 1, stirring was performed by a propeller type stirrer, and adhesion of the iron ferrocyanide was attempted by the operation similar to the operation of example 1 to thereby obtain dry powder, excluding a point that an adhesion operation was performed at 630 rpm (blade diameter: 50 mm and blade peripheral speed: 1.65 m/s). The qualitative analysis of the powder was performed by XRD. Then, the presence of a nickel ferrocyanide compound was confirmed. However, when the quantitative analysis was performed to the obtained decontaminator by X-ray fluorescence, the atomic ratio of nickel/iron was 0.19. Also, the adsorption ability of the stability cesium of the obtained particles was 24.1%. Since nickel was included only in the ferrocyanide which is a decontaminator component, a small value of nickel/iron shows that nickel is not sufficiently coated. As a result, it can be considered that the cesium adsorption ability of the decontaminator was reduced.

Further, when the test of making the cesium in the liquid adsorbed on the decontaminator, was carried out as follows: pure water 400 mL was added into fly ash 40.0 g, and thereafter the mixture was stirred for 24 hours to dissolve therein the cesium contained in the fly ash, and thereafter pH of the solution was adjusted to 10.7 with hydrochloric acid, then the decontaminator 40.0 mg {decontaminator/fly ash: 1/1000 (weight ratio)} was added and the mixture was stirred for 1 hour to cause a reaction so that the cesium in the liquid was adsorbed on the decontaminator. Then, it was confirmed that only 28.2% radioactivity was reduced, when the radioactivity of the unreacted fly ash dispersion liquid was 100%. This shows that the magnetic powder is not sufficiently coated with the ferrocyanide.

The result is shown in table 2.

As described above, the following possibility was suggested: coating with the ferrocyanide was not sufficient if normal stirring was performed with a small shear force, and an original decontamination ability could not be exhibited. Also, it was found that when the raw material was not sufficiently coated, ferrocyanide ions were remained in the liquid, thus involving a problem of desposing the liquid containing cyanide after production.

Comparative Example 3

Adhesion of iron ferrocyanide was attempted by similar operation excluding a point that an adhesion operation was performed by stirring at 240 rpm (blade peripheral speed: 0.63 m/s) by a propeller type stirrer in example 3.

Then, after adhesion processing of iron ferrocyanide, a portion of the obtained slurry was extracted, poured in the container, and placed on the magnet, coloring of the supernatant in Prussian blue was confirmed. Therefore, it was found that adhesion of the iron ferrocyanide was not sufficient if the normal stirring was performed with a small shear force.

The result is shown in table 1.

Comparative Example 4

Adhesion of iron ferrocyanide was attempted by similar operation excluding a point that ammonia was not added before the adhesion operation of PDDA in example 3.

Then, after adhesion treatment of the iron ferrocyanide, a portion of the obtained slurry was extracted, poured in the container, and placed on the magnet to make the decontaminator precipitated. Then, coloring of the supernatant in Prussian blue was confirmed. Therefore, it was found that adhesion of the iron ferrocyanide was not sufficient.

The result is shown in table 1.

Comparative Example 5

Adhesion of the iron ferrocyanide was attempted in a state of not performing washing sufficiently after coating the magnetic particle with PDDA (PH=11.22).

Then, when a portion of the obtained slurry was extracted, poured in the container, and placed on the magnet after adhesion treatment of the iron ferrocyanide, coloring of the supernatant in prussian blue was confirmed.

Therefore, it was found that adhesion of the iron ferrocyanide was not sufficient.

The result is shown in table 1.

Reference Example 1

The aggregate of the decontaminator particles was obtained by the production method similar to example 4.

Further finer particles than the particles of examples 4 to 6 in the obtained aggregate of the decontaminator particles, which are recovered by the cyclone, are recovered by a bag filter, to thereby obtain the decontaminator powder of reference example 1.

The BET value of the decontaminator of reference example 1 was 60.6 $m^2/g$.

The adsorption ability of the stability cesium of the obtained particles of the decontaminator of reference example 1 was 52.3%, and the decontaminator had a high adsorption property.

However, the test of making the cesium in the liquid adsorbed on the decontaminator, was carried out as follows: pure water 400 mL was added into fly ash 40.0 g, and thereafter the mixture was stirred for 24 hours to dissolve therein the cesium contained in the fly ash, and thereafter pH of the solution was adjusted to 10.7 with hydrochloric acid, and the decontaminator 40.0 mg {decontaminator/fly ash:1/1000 (weight ratio)} was added and the mixture was stirred for 24 hours to cause a reaction so that the cesium in the liquid was adsorbed on the decontaminator. Then, it was confirmed that decontamination percentage was remained at 29.7% radioactivity, when the radioactivity of the unreacted fly ash dispersion liquid was 100%.

The result is shown in table 3.

TABLE 1

| | Core raw material | | Organic material coating step | | Adhesion step of decontaminator | | | | | Evaluation of product | | |
| | | | | | | | | | | Separation test (during generation) | | |
| | Composition | Shape | pH adjustment | pH after reaction/ washing | The number of stirring (rpm) | Blade peripheral speed (m/s) | Metal kind | Drying | Decomposition | Magnetic separation | Supernatant state | Involvement of fly ash |
|---|---|---|---|---|---|---|---|---|---|---|---|---|
| Example 3 | Magnetite | Spherical shape | Adjusted | 8.6 | 8000 | 12.57 | Fe | In the atmosphere | Mortar | ○ | ○ | None |

TABLE 1-continued

| | Core raw material | | Organic material coating step | | Adhesion step of decontaminator | | | | | Evaluation of product Separation test (during generation) | | |
|---|---|---|---|---|---|---|---|---|---|---|---|---|
| | Composition | Shape | pH adjustment | pH after reaction/ washing | The number of stirring (rpm) | Blade peripheral speed (m/s) | Metal kind | Drying | Decomposition | Magnetic separation | Supernatant state | Involvement of fly ash |
| Com** example 1 | Magnetite | Spherical shape | Adjusted | 8.6 | 8000 | 12.57 | Fe | | None | ○ | ○ | Adjusted |
| Com** example 3 | Magnetite | Spherical shape | Adjusted | 8.6 | 240 | 0.63 | Fe | | None | ○ | X | — |
| Com** example 4 | Magnetite | Spherical shape | None | — | 8000 | 12.57 | Fe | | None | ○ | X | — |
| Com** example 5 | Magnetite | Spherical shape | Adjusted | 11.2 | 8000 | 12.57 | Fe | | None | ○ | X | — |

Com** example: Comparative example

TABLE 2

| | Core material | | Organic material coating step | | Decontaminator component adhesion step | | | | |
|---|---|---|---|---|---|---|---|---|---|
| | Composition | Shape | pH adjustment | pH after reaction/ washing | The number of stirring (rpm) | Blade peripheral speed (m/s) | Metal kind | Drying | Decomposition |
| Example 1 | Magnetite | Spherical shape | Adjusted | 8.6 | 8000 | 12.57 | Ni | In the atmosphere | Mortar |
| Example 7 | Magnetite | Spherical shape | Adjusted | 8.6 | 4000 | 6.28 | Ni | In the atmosphere | Mortar |
| Example 8 | Magnetite | Spherical shape | Adjusted | 8.6 | 2000 | 3.14 | Ni | In the atmosphere | Mortar |
| Com** example 2 | Magnetite | Spherical shape | Adjusted | 8.6 | 630 | 1.65 | Ni | In the atmosphere | Mortar |

| | Evaluation of physical property | | | | | Evaluation of product | Evaluation of decontaminator ability *1 Real fly ash |
|---|---|---|---|---|---|---|---|
| | Particle size distribution | | | | BET | Cs removal | decontamination |
| | $D_{10}$ (μm) | $D_{50}$ (μm) | $D_{90}$ (μm) | $(D_{90} - D_{10})/D_{50}$ | (m$^2$/g) | ability (%) | percentage (%) |
| Example 1 | 1.9 | 27.0 | 121.6 | 4.44 | 62.6 | 60.6 | 45.6 |
| Example 7 | 1.7 | 28.8 | 121.7 | 4.17 | 54.3 | 57.9 | 42.0 |
| Example 8 | 1.5 | 21.5 | 115.6 | 5.30 | 64.0 | 45.3 | 39.5 |
| Com** example 2 | 1.3 | 19.8 | 120.2 | 6.00 | 60.6 | 24.1 | 28.2 |

Evaluation of decontamination ability*1: stirring for 1 hour after adding decontaminator
Com** example: Comparative example

TABLE 3

| | Core material | | Evaluation of physical property | | | | | Evaluation of product | Evaluation of decontaminator ability *2 Real fly ash |
|---|---|---|---|---|---|---|---|---|---|
| | | | Particle size distribution | | | | BET | Cs removal | decontamination |
| | Composition | Shape | $D_{10}$ (μm) | $D_{50}$ (μm) | $D_{90}$ (μm) | $(D_{90} - D_{10})/D_{50}$ | (m$^2$/g) | ability (%) | percentage (%) |
| Example 4 | Iron | Needle-shape | 7.5 | 16.1 | 30.6 | 1.43 | 52.9 | 60.9 | 73.4 |
| Example 5 | Iron | Needle-shape | 18.5 | 30.5 | 43.6 | 0.82 | 60.6 | 57.4 | 71.9 |

TABLE 3-continued

| | Core material | | Evaluation of physical property | | | | Evaluation of product | Evaluation of decontaminator ability *² Real fly ash |
| | | | Particle size distribution | | | | BET | Cs removal | decontamination |
| | Composition | Shape | $D_{10}$ (μm) | $D_{50}$ (μm) | $D_{90}$ (μm) | $(D_{90} - D_{10})/D_{50}$ | (m²/g) | ability (%) | percentage (%) |
|---|---|---|---|---|---|---|---|---|---|
| Example 6 | Iron | Needle-shape | 19.2 | 30.6 | 42.6 | 0.76 | 54.8 | 44.5 | 73.8 |
| Example 9 | Iron | Needle-shape | 3.4 | 52.3 | 150.5 | 2.81 | 77.2 | 41.3 | 47.9 |
| Reference example 1 | Iron | Needle-shape | 0.7 | 1.6 | 3.3 | 1.61 | 60.6 | 52.3 | 29.7 |

Evaluation of decontamination ability*²: stirring for 24 hours after adding decontaminator

INDUSTRIAL APPLICABILITY

The concentration of the cesium in the liquid can be reduced even if there is a presence of a suspension component floating in a suspension liquid, by using the decontaminator of the present invention. As a result, the decontaminator of the present invention can be applied not only to washing water of the illustrated incineration fly ash but also to the decontamination of radioactive contaminated water.

The invention claimed is:

1. A radioactive cesium decontaminator, which is formed by agglomeration of primary particles having a coating layer made of an organic material on a surface of a magnetic particle and having a cesium absorption component made of a ferrocyanide material on a surface of the coating layer, wherein
 a cumulative diameter $D_{10}$ is 1.5 μm or more and 19.2 μm or less,
 a cumulative diameter $D_{50}$ is 16.1 μm or more and 52.3 μm or less,
 a cumulative diameter $D_{90}$ is 30.6 μm or more and 150.5 μm or less,
 a value of a cumulative diameter distribution $(D_{90}-D_{10})/D_{50}$ of the radioactive cesium decontaminator is 0.76 or more and 5.30 or less, and
 the $D_{10}$, the $D_{50}$, and the $D_{90}$ are each a cumulative diameter of the radioactive cesium decontaminator when a cumulative volume of the radioactive cesium decontaminator is 10%, 50%, and 90%, respectively, in a case that the radioactive cesium decontaminator is arranged in order from small to large based on each diameter of the radioactive cesium decontaminator obtained by a laser diffraction particle size distribution measurement.

2. The radioactive cesium decontaminator according to claim 1, wherein a primary diameter of the magnetic particle is 1 nm or more and 300 nm or less.

3. The radioactive cesium decontaminator according to claim 1, wherein a specific surface area value of the radioactive cesium decontaminator by BET method is 1 m²/g or more and 150 m²/g or less.

4. The radioactive cesium decontaminator according to claim 1, wherein the cumulative diameter $D_{50}$ is 21.5 μm or more and 30.6 μm or less.

5. The radioactive cesium decontaminator according to claim 1, wherein
 the cumulative diameter $D_{10}$ is 1.7 μm or more and 18.5 μm or less,
 the cumulative diameter $D_{50}$ is 16.1 μm or more and 30.5 μm or less,
 the cumulative diameter $D_{90}$ is 30.6 μm or more and 121.7 μm or less, and
 the value of $(D_{90}-D_{10})/D_{50}$ is 0.82 or more and 4.44 or less.

6. The radioactive cesium decontaminator according to claim 1, wherein
 the cumulative diameter $D_{10}$ is 7.5 μm or more and 18.5 μm or less,
 the cumulative diameter $D_{50}$ is 16.1 μm or more and 30.5 μm or less,
 the cumulative diameter $D_{90}$ is 30.6 μm or more and 43.6 μm or less, and
 the value of $(D_{90}-D_{10})/D_{50}$ is 0.82 or more and 1.43 or less.

7. A method of producing the radioactive cesium decontaminator according to claim 1, the method comprising:
 suspending the magnetic particle in a solvent, and coating the magnetic particle with organic monomer or polymer, to thereby form a precursor;
 adding a ferrocyanide aqueous solution and an aqueous solution containing at least one kind of transition metal into a suspension liquid containing the precursor after coating while applying a strong shear force, to thereby generate the radioactive cesium decontaminator; and
 removing water content from a slurry containing the obtained radioactive cesium decontaminator.

8. The method of producing the radioactive cesium decontaminator according to claim 7, wherein when the magnetic particle is coated with the organic monomer or polymer, coating treatment is performed by previously adding alkali into the slurry so that a liquid property is adjusted to alkaline.

9. A method of removing radioactive cesium, comprising:
 suspending a material to be treated containing radioactive cesium in a solvent, and introducing the radioactive cesium decontaminator according to claim 1 into the solvent such that the radioactive cesium decontaminator captures the radioactive cesium that exists in the solvent; and
 giving a magnetic field to the solvent, and recovering the radioactive cesium decontaminator that captured the radioactive cesium from the solvent.

10. The method of removing radioactive cesium according to claim 9, wherein:
 the radioactive cesium is dissolved in the solvent before the radioactive cesium decontaminator is introduced into the solvent; and
 the material to be treated is not separated from the solvent before the radioactive cesium decontaminator captures the radioactive cesium that exists in the solvent.

11. A radioactive cesium decontaminator, which is formed by agglomeration of primary particles comprising:
- a magnetic particle;
- a coating layer made of an organic material formed on a surface of the magnetic particle; and
- a cesium absorption component made of a ferrocyanide material formed on a surface of the coating layer, wherein a cumulative diameter $D_{10}$ of the radioactive cesium decontaminator obtained by a laser diffraction particle size distribution measurement is 1.5 μm or more and 19.2 μm or less, the cumulative diameter $D_{10}$ is a cumulative diameter of the radioactive cesium decontaminator when a cumulative volume of the radioactive cesium decontaminator is 10% and the primary particles of the radioactive cesium decontaminator are arranged in order of ascending diameter, a cumulative diameter $D_{50}$ of the radioactive cesium decontaminator obtained by a laser diffraction particle size distribution measurement is 16.1 μm or more and 52.3 μm or less, the cumulative diameter $D_{50}$ is a cumulative diameter of the radioactive cesium decontaminator when a cumulative volume of the radioactive cesium decontaminator is 50% and the primary particles of the radioactive cesium decontaminator are arranged in order of ascending diameter, a cumulative diameter $D_{90}$ of the radioactive cesium decontaminator obtained by a laser diffraction particle size distribution measurement is 30.6 μm or more and 150.5 μm or less, the cumulative diameter $D_{90}$ is a cumulative diameter of the radioactive cesium decontaminator when a cumulative volume of the radioactive cesium decontaminator is 90% and the primary particles of the radioactive cesium decontaminator are arranged in order of ascending diameter, and a value of a cumulative diameter distribution $(D_{90}-D_{10})/D_{50}$ of the radioactive cesium decontaminator is 0.76 or more and 5.30 or less.

\* \* \* \* \*